United States Patent
Uzelac et al.

(10) Patent No.: US 9,785,281 B2
(45) Date of Patent: Oct. 10, 2017

(54) ACOUSTIC TOUCH SENSITIVE TESTING

(75) Inventors: Aleksandar Uzelac, Seattle, WA (US); Andrey B. Batchvarov, Redmond, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 0 days.

(21) Appl. No.: 13/293,060

(22) Filed: Nov. 9, 2011

(65) Prior Publication Data
US 2013/0113751 A1    May 9, 2013

(51) Int. Cl.
G06F 3/041 (2006.01)
G06F 3/044 (2006.01)
G06F 11/22 (2006.01)

(52) U.S. Cl.
CPC ............ *G06F 3/0418* (2013.01); *G06F 3/041* (2013.01); *G06F 3/044* (2013.01); *G06F 11/2221* (2013.01)

(58) Field of Classification Search
CPC ...................................................... G06F 3/041
USPC ................................................. 345/177, 173
See application file for complete search history.

(56) References Cited

U.S. PATENT DOCUMENTS

| | | |
|---|---|---|
| 4,421,997 A | 12/1983 | Forys |
| 4,890,241 A | 12/1989 | Hoffman et al. |
| 5,241,693 A | 8/1993 | Kim et al. |
| 5,493,294 A | 2/1996 | Morita |
| 5,825,352 A | 10/1998 | Bisset et al. |
| 5,825,666 A | 10/1998 | Freifeld |
| 5,856,822 A | 1/1999 | Du et al. |
| 5,943,043 A | 8/1999 | Furuhata et al. |
| 5,995,081 A | 11/1999 | Kato |
| 6,008,636 A | 12/1999 | Miller et al. |
| 6,021,495 A | 2/2000 | Jain et al. |
| 6,091,406 A * | 7/2000 | Kambara .............. G06F 3/0436 178/18.04 |
| 6,218,201 B1 * | 4/2001 | Plangger ................ G09G 3/006 324/532 |
| 6,323,846 B1 | 11/2001 | Westerman et al. |
| 6,360,254 B1 | 3/2002 | Linden et al. |
| 6,377,936 B1 | 4/2002 | Henrick et al. |

(Continued)

FOREIGN PATENT DOCUMENTS

| | | |
|---|---|---|
| CN | 1242096 | 1/2000 |
| CN | 1761932 | 4/2006 |

(Continued)

OTHER PUBLICATIONS

"Technology Comparison: Surface Acoustic Wave, Optical and Bending Wave Technology", Retrieved at <<http://multimedia.3m.com/mws/mediawebserver?mwsId=66666UuZjcFSLXTtnXT2NXTaEVuQEcuZgVs6EVs6E666666--&fn=DST-Optical-SAW%20Tech%20Brief.pdf>>, 2009, pp. 4.

(Continued)

*Primary Examiner* — Jennifer Mehmood
*Assistant Examiner* — Carl Adams

(57) ABSTRACT

Acoustic touch sensitive testing techniques are described. In one or more implementations, a touch-sensitive surface of a touch-sensitive device is tested by detecting contact made with the touch sensitive surface using an acoustic sensor and comparing data describing the contact that is received from the acoustic sensor with data describing the contact that is received from the touch-sensitive device.

20 Claims, 8 Drawing Sheets

(56) References Cited

U.S. PATENT DOCUMENTS

| | | |
|---|---|---|
| 6,671,406 B1 | 12/2003 | Anderson |
| 6,741,237 B1 | 5/2004 | Benard et al. |
| 6,856,259 B1 | 2/2005 | Sharp |
| 6,959,362 B2 | 10/2005 | Wall et al. |
| 6,977,646 B1 | 12/2005 | Hauck et al. |
| 7,039,871 B2 | 5/2006 | Cronk |
| 7,053,887 B2 | 5/2006 | Kraus et al. |
| 7,174,649 B1 | 2/2007 | Harris |
| 7,254,775 B2 | 8/2007 | Geaghan et al. |
| 7,295,191 B2 | 11/2007 | Kraus et al. |
| 7,362,313 B2 | 4/2008 | Geaghan et al. |
| 7,375,454 B2 | 5/2008 | Takasaki |
| 7,489,303 B1 | 2/2009 | Pryor |
| 7,536,386 B2 | 5/2009 | Samji et al. |
| 7,580,556 B2 | 8/2009 | Lee et al. |
| 7,592,999 B2 | 9/2009 | Rosenberg et al. |
| 7,619,618 B2 | 11/2009 | Westerman et al. |
| 7,711,450 B2 | 5/2010 | Im et al. |
| 7,725,014 B2 | 5/2010 | Lam et al. |
| 7,728,821 B2 | 6/2010 | Hillis et al. |
| 7,746,325 B2 | 6/2010 | Roberts |
| 7,797,115 B2 | 9/2010 | Tasher et al. |
| 7,812,828 B2 | 10/2010 | Westerman et al. |
| 7,907,750 B2 | 3/2011 | Ariyur et al. |
| 7,938,009 B2 | 5/2011 | Grant et al. |
| 7,978,182 B2 | 7/2011 | Ording et al. |
| 8,061,223 B2 | 11/2011 | Pan |
| 8,174,273 B2 | 5/2012 | Geaghan |
| 8,217,909 B2 | 7/2012 | Young |
| 8,280,119 B2 | 10/2012 | Hamza |
| 8,311,513 B1 | 11/2012 | Nasserbakht et al. |
| 8,314,780 B2 | 11/2012 | Lin et al. |
| 8,330,474 B2 | 12/2012 | Vandermeijden |
| 8,493,355 B2 | 7/2013 | Geaghan et al. |
| 8,725,443 B2 | 5/2014 | Uzelac et al. |
| 8,773,377 B2 | 7/2014 | Zhao et al. |
| 8,913,019 B2 | 12/2014 | Zhao et al. |
| 8,914,254 B2 | 12/2014 | Uzelac et al. |
| 8,982,061 B2 | 3/2015 | Zhao et al. |
| 8,988,087 B2 | 3/2015 | Uzelac et al. |
| 9,030,437 B2 | 5/2015 | Uzelac et al. |
| 9,122,341 B2 | 9/2015 | Benko et al. |
| 9,395,845 B2 | 7/2016 | Uzelac et al. |
| 9,542,092 B2 | 1/2017 | Zhao et al. |
| 2002/0147929 A1 | 10/2002 | Rose |
| 2002/0153877 A1 | 10/2002 | Harris et al. |
| 2003/0061520 A1 | 3/2003 | Zellers et al. |
| 2003/0164820 A1 | 9/2003 | Kent |
| 2003/0200465 A1 | 10/2003 | Bhat et al. |
| 2004/0120459 A1 | 6/2004 | Crowley et al. |
| 2004/0207606 A1 | 10/2004 | Atwood et al. |
| 2005/0012724 A1* | 1/2005 | Kent .................. G06F 3/0418 345/177 |
| 2005/0046430 A1* | 3/2005 | Kinnunen ............ G01R 31/302 324/754.31 |
| 2005/0063566 A1 | 3/2005 | Beek et al. |
| 2005/0086296 A1 | 4/2005 | Chi et al. |
| 2005/0195978 A1 | 9/2005 | Babic et al. |
| 2005/0277323 A1 | 12/2005 | Eldridge et al. |
| 2006/0007177 A1 | 1/2006 | McLintock |
| 2006/0097991 A1 | 5/2006 | Hotelling et al. |
| 2006/0139340 A1* | 6/2006 | Geaghan ............... G06F 3/0416 345/177 |
| 2006/0175485 A1 | 8/2006 | Cramer |
| 2006/0227120 A1 | 10/2006 | Eikman |
| 2006/0235803 A1 | 10/2006 | Romney |
| 2006/0259957 A1 | 11/2006 | Tam et al. |
| 2007/0081726 A1 | 4/2007 | Westerman et al. |
| 2007/0262968 A1 | 11/2007 | Ohshita et al. |
| 2008/0013064 A1 | 1/2008 | Nishii |
| 2008/0024790 A1 | 1/2008 | Lu et al. |
| 2008/0041639 A1 | 2/2008 | Westerman et al. |
| 2008/0062140 A1 | 3/2008 | Hotelling et al. |
| 2008/0068229 A1 | 3/2008 | Chuang |
| 2008/0109912 A1 | 5/2008 | Rivera |
| 2008/0134343 A1 | 6/2008 | Pennington et al. |
| 2008/0150909 A1 | 6/2008 | North et al. |
| 2008/0158185 A1 | 7/2008 | Westerman |
| 2008/0180399 A1 | 7/2008 | Cheng |
| 2008/0209329 A1 | 8/2008 | DeFranco et al. |
| 2008/0211778 A1 | 9/2008 | Ording et al. |
| 2008/0211782 A1 | 9/2008 | Geaghan et al. |
| 2008/0252616 A1 | 10/2008 | Chen |
| 2008/0277171 A1 | 11/2008 | Wright |
| 2008/0278453 A1 | 11/2008 | Reynolds et al. |
| 2008/0284899 A1 | 11/2008 | Haubmann et al. |
| 2008/0309624 A1 | 12/2008 | Hotelling |
| 2008/0309629 A1 | 12/2008 | Westerman et al. |
| 2009/0009483 A1 | 1/2009 | Hotelling et al. |
| 2009/0046073 A1 | 2/2009 | Pennington et al. |
| 2009/0096753 A1 | 4/2009 | Lim |
| 2009/0141046 A1 | 6/2009 | Rathnam et al. |
| 2009/0157206 A1* | 6/2009 | Weinberg ................ G06F 3/043 700/94 |
| 2009/0160763 A1 | 6/2009 | Cauwels et al. |
| 2009/0174679 A1 | 7/2009 | Westerman |
| 2009/0190399 A1 | 7/2009 | Shibata et al. |
| 2009/0225036 A1 | 9/2009 | Wright |
| 2009/0234876 A1 | 9/2009 | Schigel et al. |
| 2009/0241701 A1 | 10/2009 | Pan |
| 2009/0250268 A1 | 10/2009 | Staton et al. |
| 2009/0251435 A1 | 10/2009 | Westerman et al. |
| 2009/0251436 A1 | 10/2009 | Keskin |
| 2009/0267903 A1 | 10/2009 | Cady et al. |
| 2009/0273584 A1 | 11/2009 | Staton et al. |
| 2009/0284495 A1 | 11/2009 | Geaghan et al. |
| 2009/0289922 A1 | 11/2009 | Henry |
| 2009/0300020 A1 | 12/2009 | Chen et al. |
| 2009/0303202 A1 | 12/2009 | Liu |
| 2009/0312009 A1 | 12/2009 | Fishel |
| 2010/0042682 A1 | 2/2010 | Kaye |
| 2010/0053099 A1 | 3/2010 | Vincent et al. |
| 2010/0060568 A1 | 3/2010 | Fisher et al. |
| 2010/0060604 A1 | 3/2010 | Zwart et al. |
| 2010/0073318 A1 | 3/2010 | Hu et al. |
| 2010/0088372 A1 | 4/2010 | Shridhar et al. |
| 2010/0097342 A1 | 4/2010 | Simmons et al. |
| 2010/0103118 A1 | 4/2010 | Townsend et al. |
| 2010/0103121 A1 | 4/2010 | Kim et al. |
| 2010/0117962 A1 | 5/2010 | Westerman et al. |
| 2010/0121657 A1 | 5/2010 | Rosenberger et al. |
| 2010/0134429 A1 | 6/2010 | You et al. |
| 2010/0142765 A1 | 6/2010 | Hamza |
| 2010/0192211 A1 | 7/2010 | Bono et al. |
| 2010/0193258 A1 | 8/2010 | Simmons et al. |
| 2010/0214233 A1 | 8/2010 | Lee |
| 2010/0231508 A1 | 9/2010 | Cruz-Hernandez et al. |
| 2010/0241711 A1 | 9/2010 | Ansari et al. |
| 2010/0265188 A1 | 10/2010 | Chang et al. |
| 2010/0266993 A1 | 10/2010 | Gregoire et al. |
| 2010/0277505 A1 | 11/2010 | Ludden et al. |
| 2010/0289754 A1 | 11/2010 | Sleeman et al. |
| 2010/0302211 A1 | 12/2010 | Huang |
| 2010/0309139 A1 | 12/2010 | Ng |
| 2010/0315266 A1 | 12/2010 | Gunawardana et al. |
| 2010/0315366 A1 | 12/2010 | Lee et al. |
| 2010/0315372 A1 | 12/2010 | Ng |
| 2011/0001633 A1 | 1/2011 | Lam et al. |
| 2011/0018822 A1 | 1/2011 | Lin et al. |
| 2011/0022414 A1 | 1/2011 | Ge et al. |
| 2011/0025629 A1 | 2/2011 | Grivna et al. |
| 2011/0042126 A1 | 2/2011 | Spaid et al. |
| 2011/0047590 A1 | 2/2011 | Carr et al. |
| 2011/0050620 A1 | 3/2011 | Hristov |
| 2011/0055062 A1 | 3/2011 | Juntilla et al. |
| 2011/0055912 A1 | 3/2011 | Fusari et al. |
| 2011/0080348 A1* | 4/2011 | Lin ........................ G06F 1/1626 345/173 |
| 2011/0084929 A1 | 4/2011 | Chang et al. |
| 2011/0106477 A1 | 5/2011 | Brunner |
| 2011/0115709 A1 | 5/2011 | Cruz-Hernandez |
| 2011/0115747 A1* | 5/2011 | Powell .................... G06F 3/042 345/175 |
| 2011/0122072 A1 | 5/2011 | Lin et al. |

(56) References Cited

U.S. PATENT DOCUMENTS

| | | |
|---|---|---|
| 2011/0126280 A1 | 5/2011 | Asano |
| 2011/0131633 A1 | 6/2011 | MacAskill et al. |
| 2011/0141054 A1 | 6/2011 | Wu |
| 2011/0163766 A1 | 7/2011 | Geaghan |
| 2011/0173547 A1 | 7/2011 | Lewis et al. |
| 2011/0214148 A1 | 9/2011 | Gossweiler et al. |
| 2011/0242001 A1* | 10/2011 | Zhang .................. G06F 3/043 345/173 |
| 2011/0248941 A1 | 10/2011 | Abdo et al. |
| 2011/0254865 A1 | 10/2011 | Yee et al. |
| 2011/0261005 A1 | 10/2011 | Joharapurkar et al. |
| 2011/0267481 A1 | 11/2011 | Kagei |
| 2011/0289143 A1 | 11/2011 | Polis et al. |
| 2011/0289406 A1 | 11/2011 | Wassingbo |
| 2011/0298709 A1 | 12/2011 | Vaganov |
| 2011/0298745 A1 | 12/2011 | Souchkov |
| 2011/0299734 A1 | 12/2011 | Bodenmueller |
| 2011/0304577 A1 | 12/2011 | Brown |
| 2011/0304590 A1 | 12/2011 | Su et al. |
| 2011/0320380 A1 | 12/2011 | Zahn et al. |
| 2012/0030624 A1 | 2/2012 | Migos |
| 2012/0032891 A1 | 2/2012 | Parivar |
| 2012/0044194 A1 | 2/2012 | Peng et al. |
| 2012/0065779 A1 | 3/2012 | Yamaguchi et al. |
| 2012/0065780 A1 | 3/2012 | Yamaguchi et al. |
| 2012/0068957 A1 | 3/2012 | Puskarich et al. |
| 2012/0075331 A1 | 3/2012 | Mallick |
| 2012/0105334 A1 | 5/2012 | Aumiller et al. |
| 2012/0113017 A1 | 5/2012 | Benko et al. |
| 2012/0117156 A1 | 5/2012 | Anka |
| 2012/0124615 A1 | 5/2012 | Lee |
| 2012/0131490 A1 | 5/2012 | Lin et al. |
| 2012/0146956 A1 | 6/2012 | Jenkinson |
| 2012/0153652 A1 | 6/2012 | Yamaguchi et al. |
| 2012/0185933 A1 | 7/2012 | Belk et al. |
| 2012/0187956 A1 | 7/2012 | Uzelac |
| 2012/0188176 A1 | 7/2012 | Uzelac |
| 2012/0188197 A1 | 7/2012 | Uzelac |
| 2012/0191394 A1 | 7/2012 | Uzelac |
| 2012/0206377 A1 | 8/2012 | Zhao |
| 2012/0206380 A1 | 8/2012 | Zhao |
| 2012/0218205 A1 | 8/2012 | Park |
| 2012/0218307 A1 | 8/2012 | Lin et al. |
| 2012/0223894 A1 | 9/2012 | Zhao |
| 2012/0259773 A1 | 10/2012 | Hoffman |
| 2012/0260158 A1 | 10/2012 | Steelberg |
| 2012/0265841 A1 | 10/2012 | Ross et al. |
| 2012/0268416 A1* | 10/2012 | Pirogov .................. G06F 3/044 345/174 |
| 2012/0280934 A1 | 11/2012 | Ha et al. |
| 2012/0280946 A1 | 11/2012 | Shih et al. |
| 2012/0301009 A1 | 11/2012 | Dabic |
| 2012/0317208 A1 | 12/2012 | Sousa et al. |
| 2012/0319992 A1 | 12/2012 | Lee |
| 2012/0331108 A1 | 12/2012 | Ferdowsi et al. |
| 2013/0016045 A1 | 1/2013 | Zhao |
| 2013/0063167 A1 | 3/2013 | Jonsson |
| 2013/0066975 A1 | 3/2013 | Kantor et al. |
| 2013/0067303 A1 | 3/2013 | Kantor et al. |
| 2013/0067594 A1 | 3/2013 | Kantor et al. |
| 2013/0113717 A1 | 5/2013 | Van Eerd et al. |
| 2013/0197862 A1 | 8/2013 | Uzelac et al. |
| 2013/0238129 A1 | 9/2013 | Rose et al. |
| 2013/0253871 A1 | 9/2013 | Gray |
| 2013/0278539 A1 | 10/2013 | Valentine et al. |
| 2013/0278550 A1 | 10/2013 | Westhues |
| 2013/0345864 A1 | 12/2013 | Park |
| 2014/0081793 A1 | 3/2014 | Hoffberg |
| 2014/0111484 A1 | 4/2014 | Welch et al. |
| 2014/0111485 A1 | 4/2014 | Welch et al. |
| 2014/0354310 A1 | 12/2014 | Hargrove et al. |
| 2015/0160781 A1 | 6/2015 | Uzelac et al. |
| 2015/0193083 A1 | 7/2015 | Uzelac et al. |

FOREIGN PATENT DOCUMENTS

| | | |
|---|---|---|
| CN | 1942853 | 4/2007 |
| CN | 200947594 | 9/2007 |
| CN | 101553777 | 10/2009 |
| CN | 101661373 | 3/2010 |
| CN | 101681219 A | 3/2010 |
| CN | 101819496 A | 9/2010 |
| CN | 101825970 A | 9/2010 |
| CN | 101937296 | 1/2011 |
| CN | 201828476 | 5/2011 |
| CN | 2201903594 | 7/2011 |
| CN | 202093112 | 12/2011 |
| CN | 101545938 | 1/2012 |
| CN | 202171626 | 3/2012 |
| CN | 202196126 | 4/2012 |
| CN | 102436334 | 5/2012 |
| CN | 101982783 | 7/2012 |
| DE | 19939159 | 3/2000 |
| EP | 2077490 | 7/2009 |
| EP | 2010055576 A | 3/2010 |
| EP | 2284654 | 2/2011 |
| EP | 2284677 A1 | 2/2011 |
| JP | 2003303051 | 10/2003 |
| JP | 2007323731 | 12/2007 |
| KR | 20010019445 A | 3/2001 |
| KR | 20050003155 | 1/2005 |
| KR | 20050094359 | 9/2005 |
| KR | 20070007963 A | 1/2007 |
| KR | 100763057 | 10/2007 |
| KR | 20080019949 A | 3/2008 |
| KR | 20080066416 | 7/2008 |
| KR | 100941441 | 2/2010 |
| KR | 20100067178 | 6/2010 |
| KR | 20100077298 | 7/2010 |
| KR | 20100129015 | 12/2010 |
| KR | 20100135982 A | 12/2010 |
| KR | 101007049 | 1/2011 |
| KR | 20110005946 A | 1/2011 |
| KR | 20110011337 | 2/2011 |
| KR | 1020110016349 A | 2/2011 |
| KR | 101065014 | 9/2011 |
| TW | 561685 B | 11/2003 |
| TW | 200925966 | 6/2009 |
| TW | M361674 | 7/2009 |
| TW | M379794 | 5/2010 |
| TW | 201104513 | 2/2011 |
| TW | M401767 U | 4/2011 |
| TW | M403688 U | 5/2011 |
| TW | 201128198 A | 8/2011 |
| TW | 201133412 A | 10/2011 |
| WO | WO-9938149 | 7/1999 |
| WO | WO-2005114369 | 12/2005 |
| WO | WO-2006042309 | 4/2006 |
| WO | WO-2010073329 | 7/2010 |
| WO | WO-2012150274 | 11/2012 |
| WO | WO-2013063042 | 5/2013 |

OTHER PUBLICATIONS

Fritz, et al., "Using Low Power Mode on the MPR083 and MPR084", Retrieved at <<http://cache.freescale.com/files/sensors/doc/app_note/AN3583.pdf>>, PAIR '10, Nov. 2011, pp. 5.

Wimmer, et al., "Modular and Deformable Touch-Sensitive Surfaces Based on Time Domain Reflectometry", Retrieved at <<http://www.medien.ifi.lmu.de/pubdb/publications/pub/wimmer2011tdrTouch/wimmer2011tdrTouch.pdf>>, UIST '11, Oct. 16-19, 2011, pp. 10.

"Actuation Force of Touch Screen", *Solutions @ Mecmesin*, retrieved from <http://www.ArticleOnePartners.com/index/servefile?fileId=188971>,(Dec. 31, 2010), 1 page.

"AO Touch Screen Tester", retrieved from <http://www.ao-cs.com/Projects/touch%20screen%20tester%20project.html>, (Dec. 31, 2010), 1 page.

(56) References Cited

OTHER PUBLICATIONS

"Capacitive Touch Sensors—Application Fields, Technology Overview and Implementation Example", *Fujitsu Microelectronics Europe GmbH*; retrieved from http://www.fujitsu.com/downloads/MICRO/fme/articles/fujitsu-whitepaper-capacitive-touch-sensors.pdf on Jul. 20, 2011, (Jan. 12, 2012),12 pages.

"Final Office Action", U.S. Appl. No. 12/941,693, (Nov. 26, 2012), 22 Pages.

"Haptic-Actuator Controllers", retrieved from <http://www.maxim-ic.com/products/data_converters/touch-interface/haptic-actuator.cfm> on May 4, 2011, 1 page.

"How to Use the Precision Touch Testing Tool", retrieved from <http://feishare.com/attachments/article/279/precision-touch-testing-tool-Windows8-hardware-certification.pdf>, (Apr. 15, 2012),10 pages.

"International Search Report", Application No. PCT/US2011/058855, (Nov. 1, 2011), 8 pages.

"Linearity Testing Solutions in Touch Panels", retrieved from <advantech.com/machine-automation/.../%7BD05BC586-74DD-4BFA-B81A-2A9F7ED489F/>, (Nov. 15, 2011), 2 pages.

"MAX11871", retrieved from <http://www.maxim-ic.com/datasheet/index.mvp/id/7203> on May 4, 2011, 2 pages.

"MicroNav Integration Guide Version 3.0", retrieved from <http://www.steadlands.com/data/interlink/micronavintguide.pdf>, (Dec. 31, 2003),11 pages.

"Microsoft Windows Simulator Touch Emulation", retrieved from <blogs.msdn.com/b/visualstudio/archive/2011/09/30/microsoft-windows-simulator-touch-emulation.aspx>, (Sep. 30, 2011), 3 pages.

"Non-Final Office Action", U.S. Appl. No. 12/941,693, (Jul. 18, 2012),19 pages.

"Non-Final Office Action", U.S. Appl. No. 13/152,991, (Mar. 21, 2013),10 pages.

"OptoFidelity Touch & Test", retrieved from <http://www.ArticleOnePartners.com/index/servefile?fileId=188969, (Feb. 20, 2012), 2 pages.

"OptoFidelity Touch and Test", retrieved from <http://www.ArticleOnePartners.com/index/servefile?fileId=188420>, (May 4, 2012), 2 pages.

"OptoFidelity Two Fingers-robot", video available at <http://www.youtube.com/watch?v=YppRASbXHfk&feature=player_embedded#!section>, (Sep. 15, 2010), 2 pages.

"PCT Search Report and Written Opinion", Application No. PCT/US2011/055621, (Jun. 13, 2012), 8 pages.

"PCT Search Report and Written Opinion", Application No. PCT/US2012/027642, (Sep. 3, 2012), 9 pages.

"PCT Search Report and Written Opinion", Application No. PCT/US2012/024780, (Sep. 3, 2012), 9 pages.

"PCT Search Report and Written Opinion", Application No. PCT/US2012/024781, (Sep. 3, 2012), 9 pages.

"Projected Capacitive Test Fixture", retrieved from <http://www.touch-intl.com/downloads/DataSheets%20for%20Web/6500443-PCT-DataSheet-Web.pdf>, (2009), 2 pages.

"Resistive Touch Screen_Resistance Linearity Test", video available at <http://www.youtube.com/watch?v=hb23GpQdXXU>, (Jun. 17, 2008), 2 pages.

"Smartphone Automatic Testing Robot at UEI Booth", video available at <www.youtube.com/watch?v=f-Qfns-b9sA>, (May 9, 2012), 2 pages.

"STM23S-2AN NEMA 23 Integrated Drive+Motor", Retrieved from: <http://www.applied-motion.com/products/integrated-steppers/stm23s-2an> on Jan. 24, 2012, 3 pages.

"Touch Panel Inspection & Testing Solution", retrieved from <http://www.ArticleOnePartners.com/index/servefile?fileId=188967>, (Dec. 31, 2010),1 page.

"Touch Panel Semi-Auto Handler Model 3810", retrieved from <http://www.chromaus.com/datasheet/3810_en.pdf>, (Dec. 31, 2010), 2 pages.

"TouchSense Systems Immersion", retrieved from <http://www.ArticleOnePartners.com/index/servefile?fileId=188486>, (Jun. 19, 2010), 20 pages.

Asif, Muhammad et al., "MPEG-7 Motion Descriptor Extraction for Panning Camera Using Sprite Generated", *In Proceedings of AVSS 2008*, Available at <http://ieeexplore.ieee.org/stamp/stamp.jsp?tp=&arnumber=4730384>,(Sep. 2008), pp. 60-66.

Baraldi, Stefano et al., "WikiTable: Finger Driven Interaction for Collaborative Knowledge-Building Workspaces", *Proceedings of the 2006 Conference on Computer Vision and Pattern Recognition Workshop (CVPRW '06)*, available at <<http://ieeexplore.ieee.org/stamp/stamp.jsp?tp=&arnumber=1640590>>,(Jul. 5, 2006), 6 pages.

Benko, Hrvoje et al., "Resolving Merged Touch Contacts", U.S. Appl. No. 12/914,693, filed Nov. 8, 2010, 22 pages.

Binns, Francis S., "Multi-"Touch" Interaction via Visual Tracking", *Bachelor of Science in Computer Science with Honours, The University of Bath*, available at <<http://www.cs.bath.ac.uk/~mdv/courses/CM30082/project.bho/2008-9/Binns-FS-dissertation-2008-9.pdf>>,(May 2009), 81 pages.

Brodkin, Jon "Windows 8 hardware: Touchscreen, sensor support and robotic fingers", <<http://arstechnica.com/business/news/2011/09/windows-8-hardware-touch-screens-sensor-support-and-robotic-fingers.ars>>, (Sep. 13, 2011), 1 Page.

Buffer, Y "Robot Touchscreen Analysis", <<http://ybuffet.posterous.com/labsmotocom-blog-archive-robot-touchscreen-an>>, (Apr. 19, 2010), 2 Pages.

Cao, Xiang et al., "Evaluation of an On-line Adaptive Gesture Interface with Command Prediction", *In Proceedings of GI 2005*, Available at <http://citeseerx.ist.psu.edu/viewdoc/download;jessionid=DAB1B08F620C23464427932BAF1ECF49?doi=10.1.1.61.6749&rep=rep1&type=pdf>,(May 2005), 8 pages.

Cao, Xiang et al., "ShapeTouch: Leveraging Contact Shape on Interactive Surfaces", *In Proceedings of TABLETOP 2008*, Available at <http://www.cs.toronto.edu/~caox/tabletop2008_shapetouch.pdf>,(2008), pp. 139-146.

Cravotta, Robert "The Battle for Multi-touch", *Embedded Insights*, retrieved from <http://www.embeddedinsights.com/channels/2011/04/12/the-battle-for-multi-touch/> on May 4, 2011,(Apr. 12, 2011), 3 pages.

Dang, Chi T., et al., "Hand Distinction for Multi-Touch Tabletop Interaction", *University of the Augsburg: Institute of Computer Science; Proceedings of the ACM International Conference on Interactive Tabletops and Surfaces*, (Nov. 23-25, 2009), 8 pages.

Dillencourt, Michael B., et al., "A General Approach to Connected-Component Labeling for Arbitrary Image Representations", *Journal of the Association for Computing Machinery*, vol. 39, No. 2, available at <<http://www.cs.umd.edu/~hjs/pubs/DillJACM92.pdf>>,(Apr. 1992), pp. 253-280.

Dillow, Clay "Liquid-Filled Robot Finger More Sensitive to Touch Than a Human's", retrieved from <www.popsci.com/technoloqy/article/2012-06/new-robot-finger-more-sensitive-touch-human> on Jul. 27, 2012, (Jun. 19, 2012), 3 pages.

Hoggan, Eve et al., "Mobile Multi-Actuator Tactile Displays", *In 2nd international conference on Haptic and audio interaction design*, retrieved from <http://www.dcs.gla.ac.uk/~stephen/papers/HAID2.pdf >,(Oct. 29, 2007),12 pages.

Hoshino, et al., "Pinching at finger tips for humanoid robot hand", Retrieved at <<http://web.mit.edu/zoz/Public/HoshinoKawabuchiRobotHand.pdf>>, (Jun. 30, 2005), 9 Pages.

Kastelan, et al., "Stimulation Board for Automated Verification of Touchscreen-Based Devices", *22nd International Conference on Field Programmable Logic and Applications*, Avaiable at <https://www2.lirmm.fr/lirmm/interne/BIBLI/CDROM/MIC/2012/FPL_202/Papers/PHD7.pdf>,(Aug. 29, 2012), 2 pages.

Kastelan, et al., "Touch-Screen Stimulation for Automated Verification of Touchscreen-Based Devices", *In IEEE 19th International Conference and Workshops on Engineering of Computer Based Systems*, (Apr. 11, 2012), pp. 52-55.

Khandkar, Shahedul H., et al., "Tool Support for Testing Complex MultiTouch Gestures", *ITS 2010*, Nov. 7-10, 2010, Saarbrucken, Germany, (Nov. 7, 2010), 10 pages.

(56) References Cited

OTHER PUBLICATIONS

Kjellgren, Olof "Developing a remote control application for Windows CE", *Bachelor Thesis performed in Computer Engineering at ABE Robotics, Miilardalen University, Department of Computer Science and Electronics*, Retrieved at <<http://www.idt.mdh.se/utbildning/exjobblfiles/TR0661.pdf>>,(May 30, 2007), 43 Pages.

Kuosmanen, Hans "OptoFidelity Automating UI Testing", video available at <http://www.youtube.com/watch?v=mOZ2r7ZvyTg&feature=player_embedded#!section>, (Oct. 14, 2010), 2 pages.

Kuosmanen, Hans "Testing the Performance of Touch-Enabled Smartphone User Interfaces", retrieved from <http://www.ArticleOnePartners.com/index/servefile?fileId=188442>, (Dec. 31, 2008), 2 pages.

Levin, Michael et al., "Tactile-Feedback Solutions for an Enhanced User Experience", retrieved from >http://www.pbinterfaces.com/documents/Tactile_Feedback_Solutions.pdf>, (Oct. 31, 2009), pp. 18-21.

McGlaun, Shane "Microsoft's Surface 2.0 Stress Testing Robot Called Patty Shown off for First Time", Retrieved at <<http://www_.slashgear._com/microsofts-surface-2_-0-stress-testing-robot_-called-patty-shown-off_-for_-first-time-19172971/>>, (Aug. 19, 2011), 1 Page.

McMahan, William et al., "Haptic Display of Realistic Tool Contact via Dynamically Compensated Conntrol of a Dedicated Actuator", *International Conference on Intelligent Robots and Systems*, St. Louis, MO, Oct. 11-15, 2009, retrieved from <http://respiratory.upenn.edu/meam_papers/222>,(Dec. 15, 2009), 9 pages.

Pratt, Susan "Factors Affecting Sensor Response", *Analog Devices, AN-830 Application Note*, Available at <http://www.analog.com/static/imported-files/application_notes/5295737729138218742AN830_0.pdf>,(Dec. 2005), pp. 1-8.

Takeuchi, et al., "Development of a Muti-fingered Robot Hand with Softness changeable Skin Mechanism", *International Symosium on and 2016 6th German Conference on Robotics (ROBOTIK)*, Retrieved at <<http://ieeexplore.ieee.org/stamp/stamp.jsp?arnumber=05756853>>,(Jun. 7, 2010), 7 Pages.

Tao, Yufei et al., "An Efficient Cost Model for Optimization of Nearest Neighbor Search in Low and Medium Dimensional Space", *Knowledge and Data Engineering*, vol. 16 Issue: 10, retrieved from <<http://www.cais.ntu.edu.sg/~jzhang/papers/ecmonns.pdf>> on Mar. 16, 2011,(Oct. 2004),16 pages.

Terpstra, Brett "BetterTouchTool Makes Multi-touch Infinitely More Useful, for Free", retrieved from <http://www.tuaw.com/2010/01/05/bettertouchtool-makes-multi-touch-infinitely-more-useful-for-fr/> on Jul. 20, 2012, (Jan. 5, 2010), 4 pages.

Toto, Serkan "Video: Smartphone Test Robot Simulates Countless Flicking and Tapping", retrieved from <techcrunch.com/2010/12/21/video-smartphone-test-robot-simulates-countless-flicking-and-tapping/>, (Dec. 21, 2010), 2 pages.

Tsuchiya, Sho et al., "Vib-Touch: Virtual Active Touch Interface for Handheld Devices", *In Proceedings of the 18th IEEE International Symposium on Robot and Human Interactive Communication*, Available at <http://www.mech.nagoya-u.ac.jp/asi/en/member/shogo_okamoto/papers/tsuchiyaROMAN2009.pdf>,(Oct. 2009), pp. 12-17.

Westman, Tapani et al., "Color Segmentation by Hierarchical Connected Components Analysis with Image Enhancement by Symmetric Neighborhood Filter", *Pattern Recognition, 1990. Proceedings., 10th International Conference on Jun. 16-21, 1990*, retrieved from <<http://ieexplore.ieee.org/stamp/stamp.jsp?tp=&arnumber=118219>> on Mar. 16, 2011,(Jun. 16, 1990), pp. 796-802.

Wilson, Andrew D., "TouchLight: An Imaging Touch Screen and Display for in Gesture-Based Interaction", *In Proceedings of ICIM 2004*, Available at <http://citeseerx.ist.psu.edu/viewdoc/download?doi=doi=10.1.1.95.3647&rep=rep1&type=pdf>,(Oct. 2004), 8 pages.

Zivkov, et al., "Touch Screen Mobile Application as Part of Testing and Verification System", *Proceedings of the 35th International Convention*, (May 21, 2012), pp. 892-895.

"Input Testing Tool", U.S. Appl. No. 13/659,777, filed Oct. 24, 2012, 45 pages.

"Non-Final Office Action", U.S. Appl. No. 12/941,693, (May 16, 2013),13 pages.

"Non-Final Office Action", U.S. Appl. No. 13/183,377, (Jun. 21, 2013),10 pages.

"PCT Search Report and Written Opinion", Application No. PCT/US2013/021787, (May 13, 2013), 9 pages.

"Touch Quality Test Robot", U.S. Appl. No. 13/530,692, filed Jun. 22, 2012, 40 pages.

"Final Office Action", U.S. Appl. No. 13/154,161, Apr. 22, 2014, 16 pages.

"Final Office Action", U.S. Appl. No. 13/530,692, Apr. 10, 2014, 16 pages.

"Foreign Office Action", CN Application No. 201210018527.8, Feb. 24, 2014, 10 Pages.

"Foreign Office Action", CN Application No. 201210029859.6, Feb. 21, 2014, 15 Pages.

"International Search Report and Written Opinion", Application No. PCT/US2013/061067, Feb. 7, 2014, 11 pages.

"Non-Final Office Action", U.S. Appl. No. 13/152,991, Mar. 21, 2014, 18 pages.

"Non-Final Office Action", U.S. Appl. No. 13/183,377, Feb. 27, 2014, 12 pages.

"Non-Final Office Action", U.S. Appl. No. 13/530,692, Jan. 31, 2014, 14 pages.

"Non-Final Office Action", U.S. Appl. No. 13/156,243, Sep. 19, 2013, 12 pages.

"Final Office Action", U.S. Appl. No. 13/183,377, Oct. 15, 2013, 12 pages.

"International Search Report and Written Opinion", Application No. PCT/US2013/046208, Sep. 27, 2013, 12 pages.

"Non-Final Office Action", U.S. Appl. No. 13/099,288, Feb. 6, 2014, 13 pages.

"Non-Final Office Action", U.S. Appl. No. 13/198,036, Jan. 31, 2014, 14 pages.

"Final Office Action", U.S. Appl. No. 13/152,991, Sep. 20, 2013, 14 pages.

"Non-Final Office Action", U.S. Appl. No. 13/154,161, Jan. 3, 2014, 14 pages.

"Non-Final Office Action", U.S. Appl. No. 12/941,693, Nov. 18, 2013, 21 Pages.

"Notice of Allowance", U.S. Appl. No. 13/156,243, Jan. 28, 2014, 8 pages.

"Notice of Allowance", U.S. Appl. No. 13/198,415, Dec. 26, 2013, 8 pages.

"Foreign Office Action", CN Application No. 201210031164.1, Mar. 5, 2014, 14 Pages.

"Restriction Requirement", U.S. Appl. No. 13/205,319, May 8, 2014, 6 pages.

"Foreign Office Action", TW Application No. 101100606, Apr. 15, 2014, 10 pages.

"Non-Final Office Action", U.S. Appl. No. 13/099,288, Jun. 10, 2014, 22 pages.

"Corrected Notice of Allowance", U.S. Appl. No. 13/156,243, Jun. 6, 2014, 4 pages.

"Corrected Notice of Allowance", U.S. Appl. No. 13/530,692, Apr. 23, 2015, 4 pages.

"Final Office Action", U.S. Appl. No. 13/152,991, May 6, 2015, 20 pages.

"Foreign Notice of Allowance", TW Application No. 101100609, Feb. 26, 2015, 4 pages.

"Foreign Office Action", CN Application No. 201210029859.6, Apr. 7, 2015, 8 Pages.

"Non-Final Office Action", U.S. Appl. No. 13/198,036, Apr. 16, 2015, 13 pages.

"Notice of Allowance", U.S. Appl. No. 12/941,693, May 6, 2015, 8 pages.

"Corrected Notice of Allowance", U.S. Appl. No. 13/154,161, Feb. 24, 2015, 2 pages.

"Corrected Notice of Allowance", U.S. Appl. No. 13/205,319, Feb. 26, 2015, 2 pages.

(56) References Cited

OTHER PUBLICATIONS

"Corrected Notice of Allowance", U.S. Appl. No. 13/205,319, Apr. 2, 2015, 2 pages.
"Foreign Office Action", CN Application No. 201210031164.1, Feb. 16, 2015, 7 Pages.
"Non-Final Office Action", U.S. Appl. No. 13/152,991, Dec. 31, 2014, 18 pages.
"Non-Final Office Action", U.S. Appl. No. 13/905,093, Feb. 20, 2015, 18 pages.
"Notice of Allowance", U.S. Appl. No. 12/941,693, Jan. 12, 2015, 8 Pages.
"Notice of Allowance", U.S. Appl. No. 13/530,692, Mar. 3, 2015, 8 pages.
"Extended European Search Report", EP Application No. 11840170.2, Jul. 16, 2014, 10 pages.
"Final Office Action", U.S. Appl. No. 13/152,991, Aug. 20, 2014, 14 pages.
"Final Office Action", U.S. Appl. No. 13/198,036, Aug. 14, 2014, 17 pages.
"Foreign Notice of Allowance", CN Application No. 201110349777.5, May 28, 2014, 6 pages.
"Foreign Office Action", CN Application No. 201210031164.1, Sep. 11, 2014, 9 Pages.
"Non-Final Office Action", U.S. Appl. No. 13/530,692, Aug. 25, 2014, 18 pages.
"Non-Final Office Action", U.S. Appl. No. 13/205,319, Sep. 9, 2014, 13 pages.
"Notice of Allowance", U.S. Appl. No. 12/941,693, Aug. 13, 2014, 8 pages.
"Notice of Allowance", U.S. Appl. No. 13/183,377, Jul. 18, 2014, 7 pages.
"Notice of Allowance", U.S. Appl. No. 13/362,238, Jul. 28, 2014, 11 pages.
"Supplemental Notice of Allowance", U.S. Appl. No. 13/362,238, Sep. 18, 2014, 4 pages.
"Corrected Notice of Allowance", U.S. Appl. No. 13/362,238, Nov. 18, 2014, 2 pages.
"Foreign Notice of Allowance", TW Application No. 101100606, Sep. 29, 2014, 4 pages.
"Foreign Office Action", CN Application No. 201210018527.8, Oct. 29, 2014, 12 pages.
"Foreign Office Action", CN Application No. 201210029859.6, Oct. 17, 2014, 8 Pages.
"Foreign Office Action", CN Application No. 201210446236.9, Dec. 3, 2014, 11 pages.
"Notice of Allowance", U.S. Appl. No. 13/099,288, Oct. 28, 2014, 9 pages.
"Notice of Allowance", U.S. Appl. No. 13/154,161, Nov. 7, 2014, 10 pages.
"Notice of Allowance", U.S. Appl. No. 13/205,319, Dec. 19, 2014, 8 pages.
"Search Report", TW Application No. 101100609, Oct. 16, 2014, 1 page.
"Final Office Action", U.S. Appl. No. 13/905,093, Aug. 19, 2015, 17 pages.
"Foreign Notice of Allowance", CN Application No. 201210031164.1, Jul. 6, 2015, 3 Pages.
"Foreign Office Action", CN Application No. 201210018527.8, Jul. 10, 2015, 13 Pages.
"Second Office Action and Search Report Issued in Chinese Patent Application No. 201210446236.9", Mailed Date: Nov. 13, 2015, 13 Pages.
"Fourth Office Action Issued in Chinese Patent Application No. 201210029859.6", dated Oct. 21, 2015, 7 Pages.
"Notice of Allowance Issued in Chinese Patent Application No. 201210029859.6", dated Feb. 6, 2016, 4 Pages.
"First Office Action and Search Report Issued in Chinese Patent Application No. 201210052934.0", dated Dec. 24, 2015, 13 pages.
"Notice of Allowance Issued in Chinese Patent Application No. 201210052934.0", dated Dec. 28, 2016, 4 Pages.

"Second Office Action Issued in Chinese Patent Application No. 201210052934.0", dated Aug. 4, 2016, 13 Pages.
"Notice of Allowance Issued in Chinese Patent Application No. 201210446236,9", dated Apr. 26, 2016, 4 Pages.
Li, et al., "Role Based Access Control for Social Network Sites", In Proceedings of Joint Conferences on Pervasive Computing (JCPC), Dec. 3, 2009. pp. 389-393.
"International Search Report and Written Opinion Issued in PCT Application No. PCT/US12/53681", dated Feb. 27, 2013, 11 Pages.
"International Search Report and Written Opinion Issued in PCT Application No. PCT/US2012/053621", dated Feb. 20, 2013, 10 Pages.
"International Preliminary Report on Patentability Issued in PCT Application No. PCT/US2014/064483", dated Jan. 27, 2016, 8 Pages.
"Moss User Permissions and 'Modify Shared Webpart' Link", Retrieved from <<https://social.technet.microsoft.com/forums.sharepoint/en-US/bf893562-7f49-48bd-8d12-5befca34dba5/moss-user-permissions-and-modify-shared-webpart-link?forum=sharepointgenerallegacy>>, Retrieved Date: Aug. 8, 2011, 3 Pages.
"International Search Report & Written Opinion for PCT Patent Application No. PCT/US2014/064483", dated Mar. 16, 2015, 10 Pages.
"Office Web Apps: Share files on SkyDrive", Retrieved from <<http://web.archive.org/web/20101203074521/http://explore.live.com/office-web-apps-skydrive-share-files-using>>, Retrieved Date: Aug. 8, 2011, 1 Page.
"Public or Private Articles", Retrieved from<<http://web.archive.org/web/20111112135351/http://www.presspublisher.com/features/public-or-private-articles/>>, Retrieved Date: Aug. 11, 2011, 3 Pages.
"Setting Sharing Permissions for Google Docs and Google Sites", Retrieved from <<http://www.library.kent.edu/files/SMS_Sharing_Permissions.pdf>>, Retrieved Date: Aug. 8, 2011, 8 Pages.
"Share Office Documents in SkyDrive", Retrieved from http://office.microsoft.com/enus/web-apps-help/share-office-documents-in-skydrive-HA101820121.aspx>>, Retrieved Date: Aug. 8, 2011, 3 Pages.
"Shared Folder Permissions", Retrieved from <<http://web.archive.org/web/20111020095512/http://www.tech-faq.com/shared-folder-permissions.html>>, Aug. 8, 2011, 7 Pages.
"Notice of Allowance Issued in Taiwan Patent Application No. 100135900", dated Mar. 28, 2016, 4 Pages.
"Notice of Allowance Issued in Taiwan Patent Application No. 101107036", dated Feb. 16, 2016, 4 Pages.
"Office Action Issued in Taiwan Patent Application No. 101107036", dated Oct. 27, 2015, 9 Pages.
"Office Action Issued in Taiwan Patent Application No. 102100728", dated Jul. 7, 2016, 10 Pages.
"Office Action Issued in Taiwan Patent Application No. 102100728", dated Nov. 9, 2016, 4 Pages.
"Notice of Allowance Issued in Taiwan Patent Application No. 103124288", dated Apr. 14, 2016, 4 Pages.
"Search Report Issued in European Patent Application No. 12744496.6", dated Oct. 7, 2016, 8 Pages.
"Search Report Issued in European Patent Application No. 12744979.1", dated Mar. 28, 2017, 10 Pages.
"Searh Report Issued in European Patent Application No. 12754354.4", dated Aug. 6, 2014, 8 Pages.
"Corrected Notice of Allowance Issued in U.S. Appl. No. 13/152,991", dated Nov. 21, 2016, 2 Pages.
"Corrected Notice of Allowance Issued in U.S. Appl. No. 13/152,991", dated Dec. 12, 2016, 2 Pages.
"Final Office Action Issued in U.S. Appl. No. 13/152,991", dated Jul. 20, 2016, 11 Pages.
"Non Final Office Action Issued in U.S. Appl. No. 13/152,991", dated Dec. 14, 2015, 15 Pages.
"Notice of Allowance Issued in U.S. Appl. No. 13/152,991", dated Aug. 25, 2016, 8 Pages.
"Final Office Action Issued in U.S. Appl. No. 13/198,036", dated Jun. 16, 2016, 41 Pages.

(56) References Cited

OTHER PUBLICATIONS

"Final Office Action Issued in U.S. Appl. No. 13/198,036", dated May 4, 2017, 62 Pages.
"Non Final Office Action Issued in U.S. Appl. No. 13/198,036", dated Sep. 9, 2016, 52 Pages.
"Non Final Office Action Issued in U.S. Appl. No. 13/228,283", dated Aug. 27, 2013, 13 Pages.
"Final Office Action Issued in U.S. Appl. No. 13/229,121", dated Nov. 21, 2013, 15 Pages.
"Non Final Office Action Issued in U.S. Appl No. 13/229,121", dated Jun. 7, 2013, 14 Pages.
"Final Office Action Issued in U.S. Appl. No. 13/229,214", dated Jul. 26, 2013, 27 Pages.
"Non Final Office Action Issued in U.S. Appl. No. 13/229,214", dated Feb. 15, 2013, 25 Pages.
"Non Final Office Action Issued in U.S. Appl. No. 13/229,214", dated Mar. 26, 2014, 27 Pages.
"Second Written Opinion Issued in PCT Application No. PCT/US2014/064483", dated Oct. 2, 2015, 7 Pages.
"Final Office Action Issued in U.S. Appl. No. 13/659,777", dated Aug. 13, 2015, 11 Pages.
"Final Action Issued in U.S. Appl. No. 13/659,777", dated Apr. 29, 2015, 10 Pages.
"Notice of Allowance Issued in U.S. Appl. No. 13/659,777", dated Dec. 18, 2015, 5 Pages.
"Non Final Office Action Issued in U.S. Appl. No. 13/659,777", dated Nov. 4, 2014, 11 Pages.
"Final Office Action Issued in U.S. Appl. No. 13/664,840", dated Mar. 27, 2015, 15 Pages.
"Final Office Action Issued in U.S. Appl. No. 13/664,840", dated Mar. 11, 2016, 16 Pages.
"Final Office Action Issued in U.S. Appl. No. 13/664,840", dated May 4, 2017, 18 Pages.
"Non Final Office Action Issued in U.S. Appl. No. 13/664,840", dated Jul. 5, 2016, 16 Pages.
"Non Final Office Action Issued in U.S. Appl. No. 13/664,840", dated Jul. 15, 2014, 15 Pages.
"Non Final Office Action Issued in U.S. Appl. No. 13/664,840", dated Sep. 18, 2015, 17 Pages.
"Final Office Action Issued in U.S. Appl. No. 13/905,093", dated Jun. 15, 2016, 18 Pages.
"Non Final Office Action Issued in U.S. Appl. No. 13/905,093", dated Jan. 29, 2016 18 Pages.
"Final Office Action Issued in U.S. Appl. No. 14/620,819", dated Jan. 27, 2017, 9 Pages.
"Non Final Office Action Issued in U.S. Appl. No. 14/620,819", dated Aug. 12, 2016, 23 Pages.
"Non Final Office Action Issued in U.S. Appl. No. 14/662,512", dated Oct. 5, 2015, 9 Pages.
"Notice of Allowance Issued in U.S. Appl. No. 14/662,512", dated Apr. 19, 2016, 8 Pages.
"Fifth Office Action Issued in Chinese Patent Application No. 201210018527.8", dated Jun. 28, 2016, 15 Pages.
"Fourth Office Action and Search Report Issued in Chinese Patent Application No. 201210018527.8", dated Jan. 18, 2016, 15 Pages.
"Notice of Allowance Issued in Chinese Patent Application No. 201210018527.8", dated Jan. 9, 2017, 4 Pages.

* cited by examiner

500

700

702
Test a touch-sensitive surface of a touch-sensitive device

704
Detect contact made with the touch-senstivie surface using an acoustic sensor 706
Compare data describing the contact that is received from the acoustic sensor with data describing the contact that is received from the touch-sensitive device

ACOUSTIC TOUCH SENSITIVE TESTING

BACKGROUND

Display and input techniques utilized by computing devices are ever evolving. For example, initial computing devices were provided with monitors. A user interacted with the computing device by viewing simple text on the monochrome monitor and entering text via a keyboard that could then be viewed on the monitor. Other techniques were then subsequently developed, such as graphical user interfaces and cursor control devices.

Display and input techniques have continued to evolve, such as to sense touch using a touchscreen display of a computing device to recognize gestures. A user, for instance, may interact with a graphical user interface by inputting a gesture using the user's hand that is detected by the touchscreen display or other touch-sensitive device. However, traditional techniques that were utilized to test touchscreen displays and other touch-sensitive devices were often inaccurate and therefore were typically inadequate to test the touchscreen displays as suitable for intended use of the device.

SUMMARY

Acoustic touch sensitive testing techniques are described. In one or more implementations, a touch-sensitive surface of a touch-sensitive device is tested by detecting contact made with the touch sensitive surface using an acoustic sensor and comparing data describing the contact that is received from the acoustic sensor with data describing the contact that is received from the touch-sensitive device.

In one or more implementations, an apparatus includes an acoustic sensor configured for placement proximal a touch-sensitive surface and one or more modules implemented at least partially in hardware to use a signal received from the acoustic sensor and a signal received from the touch-sensitive surface to test the touch-sensitive surface.

In one or more implementations, a system includes one or more modules that are implemented at least partially in hardware and configured to test latency of a touchscreen of a touchscreen device using a signal received from an acoustic sensor that is disposed proximal to a touchscreen of the touchscreen device to detect contact made with the touchscreen and data received from the touchscreen device that describes the contact.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Conventional techniques that were utilized to test touchscreens and other touch-sensitive devices were often difficult to reproduce. Consequently, test results from these conventional techniques could be inaccurate and difficult to interpret and thus often failed for their intended purpose.

Acoustic touch sensitive testing techniques are described herein. In one or more implementations, techniques are described in which acoustic techniques are utilized to test a touch-sensitive device, such as a touchscreen. For example, an acoustic sensor may be used to detect "when" contact is made with a touchscreen of a touchscreen device. The input detected using the acoustic sensor may then be compared with an input generated by the touchscreen device to test functionality of the touchscreen device, such as to determine latency. Further discussion of these and other testing techniques may be found in relation to the following sections.

In the following discussion, an example environment is first described that may employ the testing techniques described herein in relation to a touchscreen device. However, it should be readily apparent that a variety of touch sensitive devices are also contemplated, such as track pads and other sensing devices. Example procedures are then described which may be performed in the example environment as well as other environments. Consequently, performance of the example procedures is not limited to the example environment and the example environment is not limited to performance of the example procedures.

Example Environment

Figure 1:
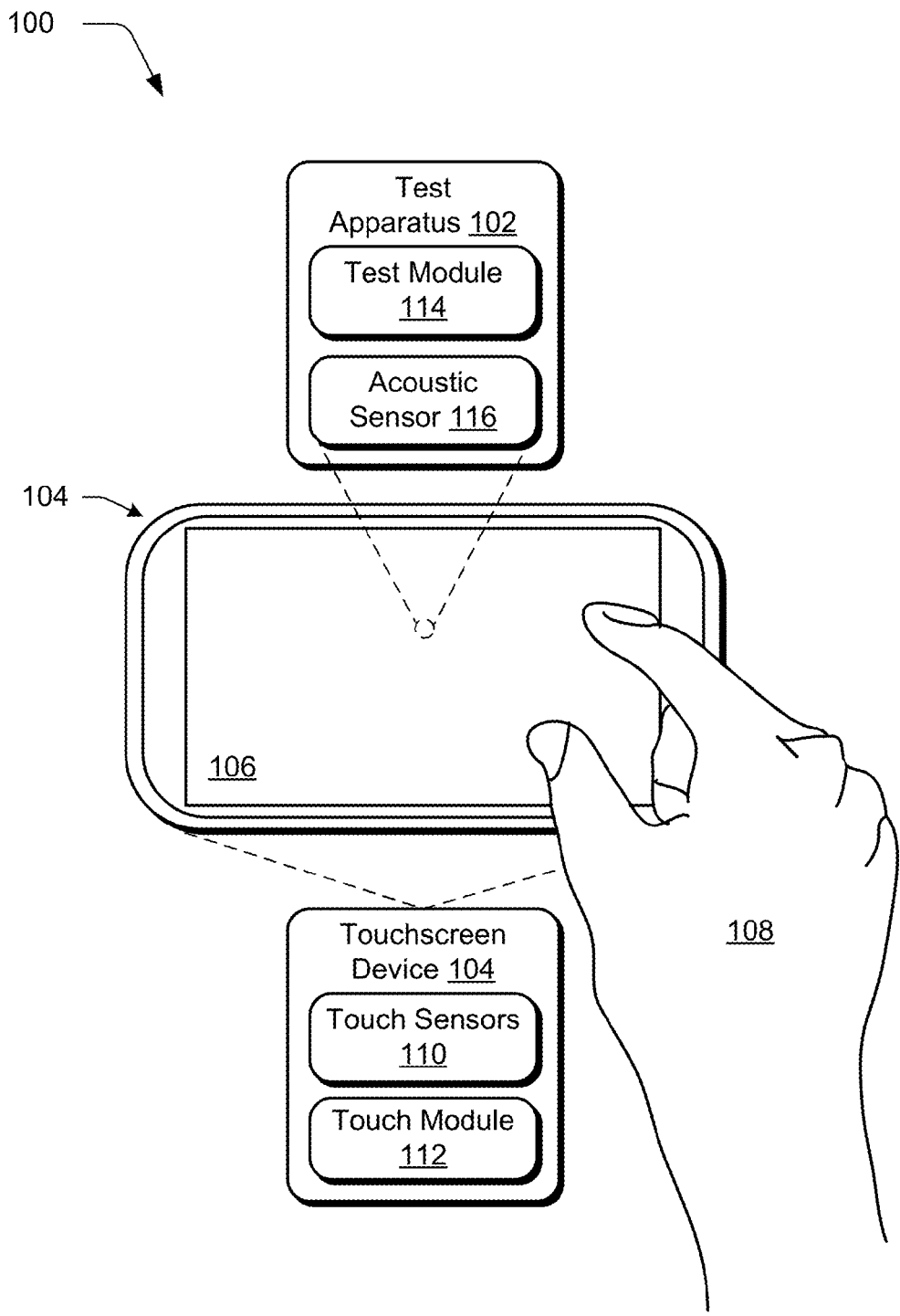
FIG. 1 is an illustration of an environment in an example implementation that is operable to utilize acoustic testing techniques described herein.

FIG. 1 depicts an environment 100 in an example implementation that includes a test apparatus 102 that is suitable to test a touchscreen device 104. The touchscreen device 104 may be configured in a variety of ways. For example, the touchscreen device 104 may be configured as part of a mobile communication device such as a mobile phone, a portable game-playing device, a tablet computer, as part of a traditional computing device (e.g., a display device that is part of a laptop or personal computer), and so on.

Additionally, the touchscreen 106 of the touchscreen device 104 may be configured in a variety of ways. For example, the touchscreen 106 of the touchscreen device 104 may include sensors that are configured to detect proximity (e.g., contact) with the touchscreen 106. Touch sensors 110 are typically used to report actual contact with the touchscreen 106, such as when being touched with a finger of a user's hand 108.

Examples of such touch sensors 110 include capacitive touch sensors. For instance, in projected capacitance an X-Y grid may be formed across the touchscreen using near optically transparent conductors (e.g., indium tin oxide) to detect contact at different X-Y locations on the touchscreen 106. Other capacitance techniques are also contemplated, such as surface capacitance, mutual capacitance, self-capacitance, and so on. Further, other touch sensors 110 are also contemplated in other instances, such as infrared, optical imaging, dispersive signal technology, acoustic pulse recognition, and so on.

Regardless of the type of touch sensors 110 used, inputs detected by the touch sensors 110 may then be processed by the touch module 112 to detect characteristics of the inputs, which may be used for a variety of purposes. For example, the touch module 112 may recognize that the touch input indicates selection of a particular object, may recognize one or more inputs as a gesture usable to initiate an operation of the touchscreen device 104 (e.g., expand a user interface), and so forth. However, this processing may rely upon the accuracy of the inputs and therefore conventional techniques that were utilized to test the touchscreen 106 could result in an inaccurate touchscreen making it to market, which could hinder a user's interaction with the device.

In one or more implementations described herein, an ability of a touchscreen 106 to detect contact (e.g., by a finger of a user's hand 108) is tested by the test apparatus 102. For example, the test apparatus 102 may include a test module 114 and acoustic sensor 116. The acoustic sensor 116 may be utilized to test the touchscreen device 104 in a variety of ways. For instance, the test module 114 may leverage the acoustic sensor 116 to measure response latency the touchscreen device 104, such as an ability of the touch module 112 to detect contact by one or more fingers of the user's hand 108 (or other objects) with the touchscreen 106. This may be performed in a variety of ways, an example of which may be found in relation to FIG. 2.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the test apparatus 102 and/or the touchscreen device 104 may be implemented using a computing device. The computing device may also include an entity (e.g., software) that causes hardware of the computing device to perform operations, e.g., processors, functional blocks, a "system-on-a-chip," and so on. For example, the computing device may include a computer-readable medium that may be configured to maintain instructions that cause the computing device, and more particularly hardware of the computing device to perform operations. Thus, the instructions function to configure the hardware to perform the operations and in this way result in transformation of the hardware to perform functions. The instructions may be provided by the computer-readable medium to the computing device through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Figure 2:
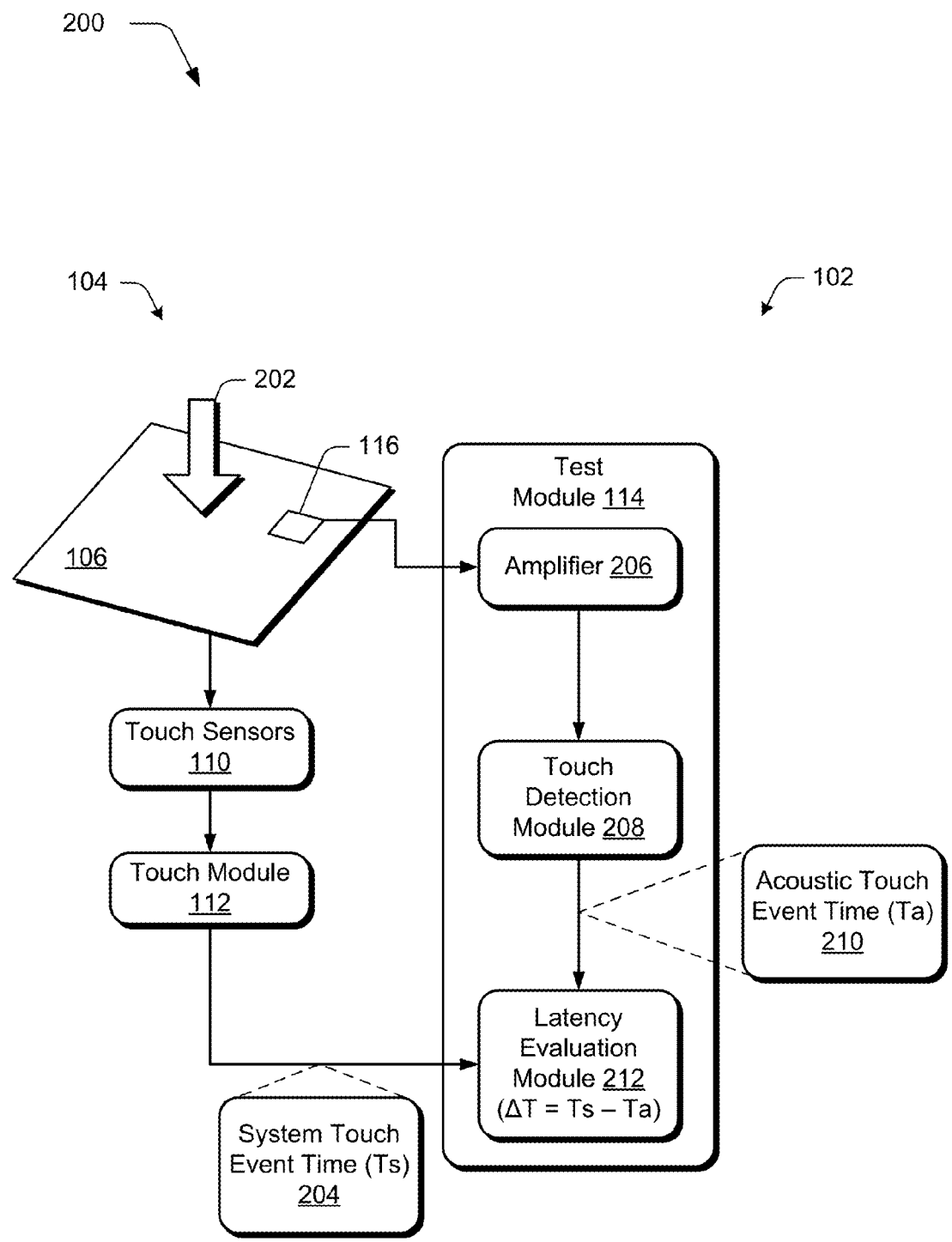
FIG. 2 is an illustration of a system in an example implementation showing a test apparatus of FIG. 1 in greater detail.

FIG. 2 is an illustration of a system 200 in an example implementation showing the test apparatus 102 of FIG. 1 in greater detail. The test apparatus 102 in this example is configured to leverage acoustic wave detection to evaluate latency of a touch-sensitive device, such as the touchscreen 106 of the touchscreen device 104. The test module 114, for instance, may be configured to detect a sound wave produced when contact 202 is made with a surface, e.g., the touchscreen 106 in this example, which may be used to define a moment at which physical touch has occurred.

Processing of one or more contacts by a touchscreen device 104 may involve the following. First, physical contact 202 is detected by one or more touch sensors 110 of the touchscreen device 104, resulting in an electrical signal. The electrical signal is then processed by the touch module 112 to determine "what" the signal describes, e.g., characteristics of the contact 202 such as where the contact occurred. This processing may then be reported to the test module 114 as a system touch event time 204 (Ts) 204 for testing purposes. Thus, detection and processing of the contact 202 may take time to complete, which may therefore be thought of as latency of the touchscreen device 104 in detecting the contact 202.

In order to test latency, the test module 114 may employ one or more acoustic sensors 116 (e.g., a piezo-transducer) that are positioned at or near the touch-sensitive surface, e.g., the touchscreen 106. A signal from the acoustic sensors 116 may then be amplified by an amplifier 206 and processed by a touch detection module 208 to determine an acoustic touch event time (Ta) 210. This processing, for instance, may include identification of an actual signal from background noise detected by the acoustic sensors 116. A latency evaluation module 212 may then determine a time associated with a touch event, e.g., the moment of contact. This may be determined by detecting a difference in the amount of time between the system touch event time 204 and the acoustic touch event time 210.

As should be readily apparent, operation of the test apparatus 102 may also involve latency. This may include duration and latency of the physical process occurring during interaction of the touching object with the touch sensitive surface which produces acoustic waves, speed of the propagation of the acoustic waves on that surface, distance between touch point and acoustic sensor, latency in producing electrical signal in the electronic acoustic detector, and latency of an electronic registration system used to store results of the latency evaluation module 212. However, this latency is generally below one millisecond.

For example, production of an acoustic vibration on the touch surface from the contact 202 is generally between 30 and 100 uS in case of hard surface as a glass or wood and depends on the speed of the contact. As the speed of sound on a solid surface is in the order of over a thousand of meters per second, the time taken for the acoustic vibrations to reach the sensor may be within few hundreds microseconds when the acoustic sensor 116 is positioned within few centimeters from the point of contact 202. Hence, if a piezo-transducer is used as acoustic detector, then the time used to produce an electrical signal from acoustic vibrations may be below one microsecond. The amount of time consumed by the touch detection module 208 to identify the contact 202 that produced acoustic signal from the background noise may be dependent on a level of that noise, frequency and magnitude of the touch event signal, and so on.

In an implementation example, the system 200 may be configured as follows. In order to produce the contact 202, a thin conductive plate may be positioned on the surface of the touch-sensitive surface to be tested to act as the contact 202. The conductive plate and the human body are connected to an electrical circuit so that when the finger touches the plate and electrical current flows through the finger and plate. The electrical current is amplified and a voltage drop on a resistor is measured in order to detect the moment and dynamics of the contact 202. Although use of a user is described, this process may also be automated using non-human motion.

Figure 3:
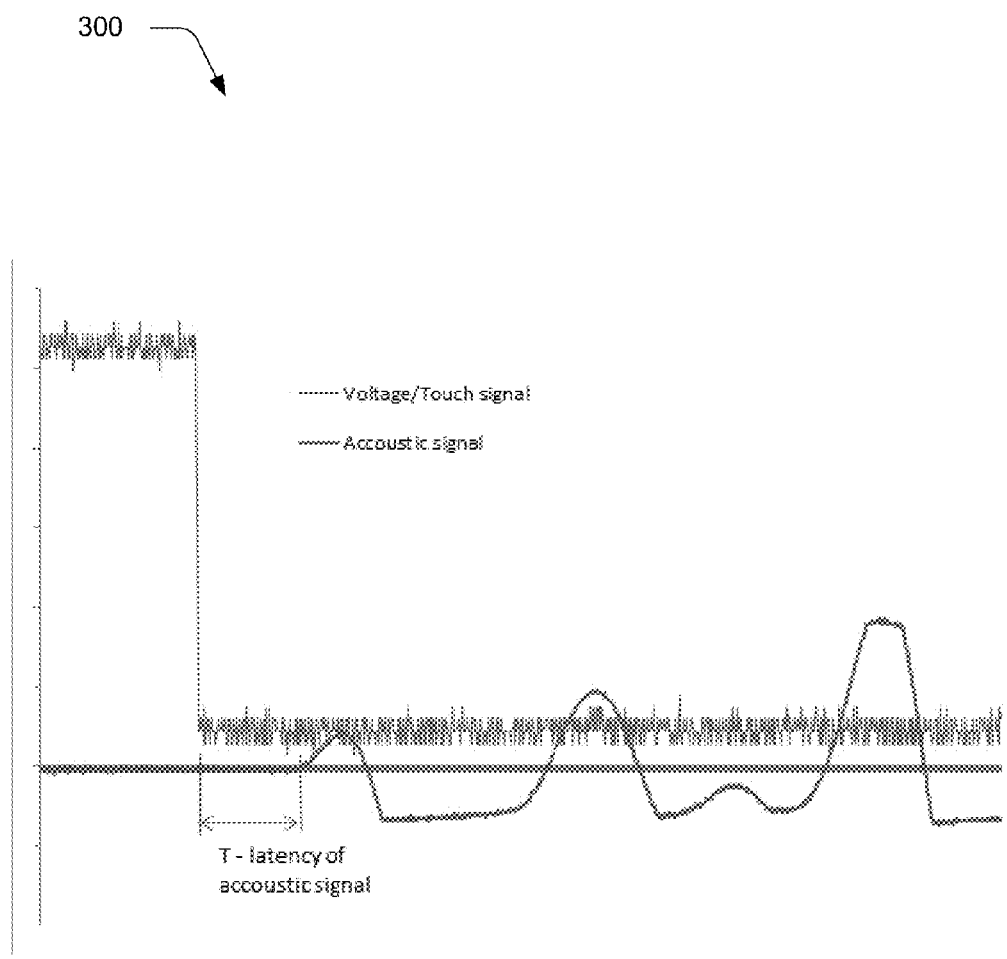
FIG. 3 depicts a graph showing an electrical voltage drop on a resistor as being used as a reference as to when contact occurred.

An acoustic sensor 116 is positioned close to the conductive plate. A signal from the acoustic sensor 116 is amplified and recorded by the test module 114 as described earlier. An electrical voltage drop on the resistor is then used as reference to when the actual touch contact occurred, an example of which is shown in the graph 300 of FIG. 3.

Figure 4:
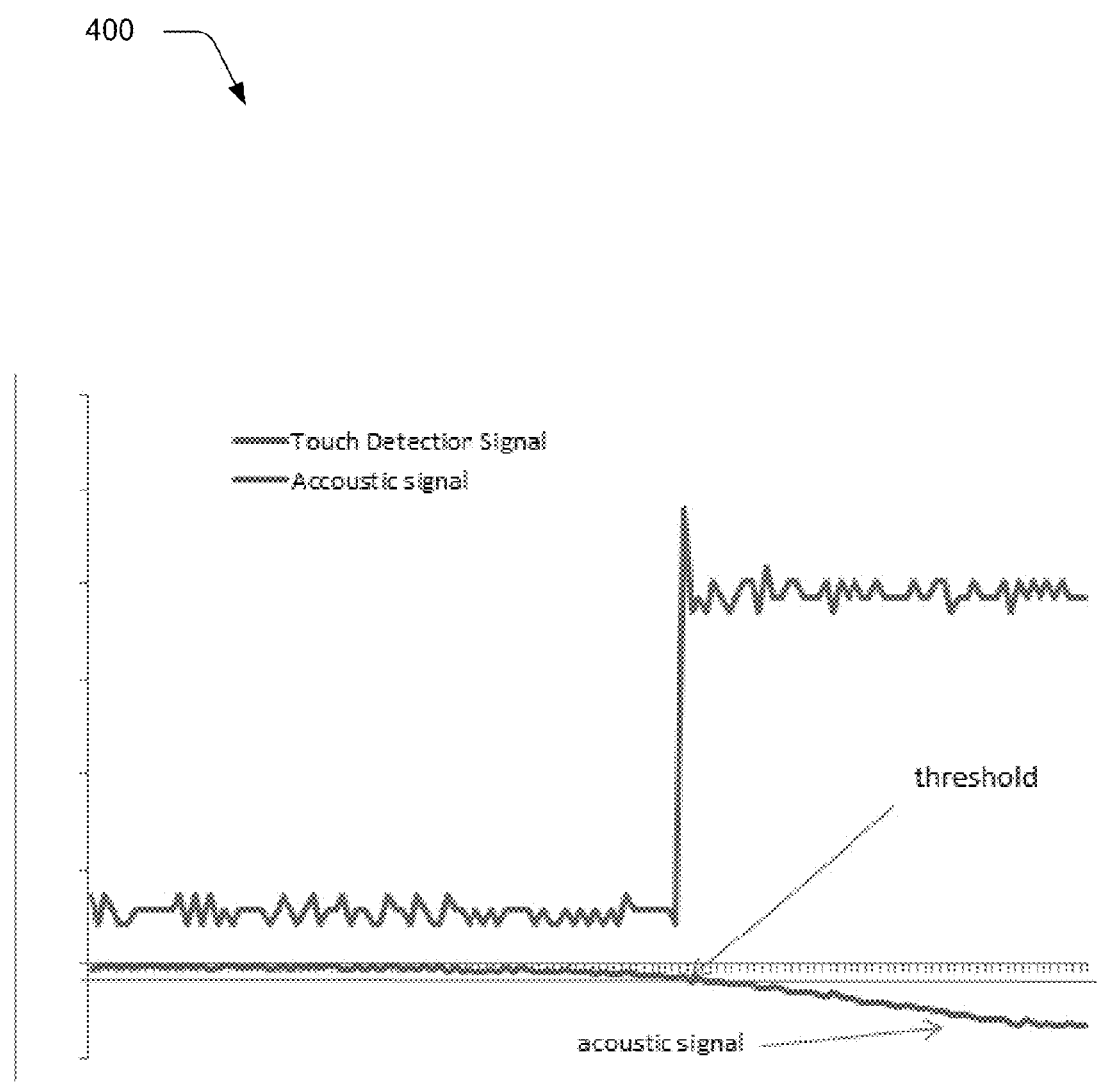
FIG. 4 depicts a graph showing latency induced by physical processes producing a sound wave as defined as a difference between a moment the signal from acoustic wave crosses a predefined threshold and a moment a voltage drop occurred.

Latency induced by physical processes producing sound wave is defined as difference between the moment the signal from acoustic wave crosses a predefined threshold and the moment the voltage drop occurred as shown by the graph 400 of FIG. 4. The threshold, for instance, may be defined to be greater than a maximum magnitude of the existing background noise.

Figure 5:
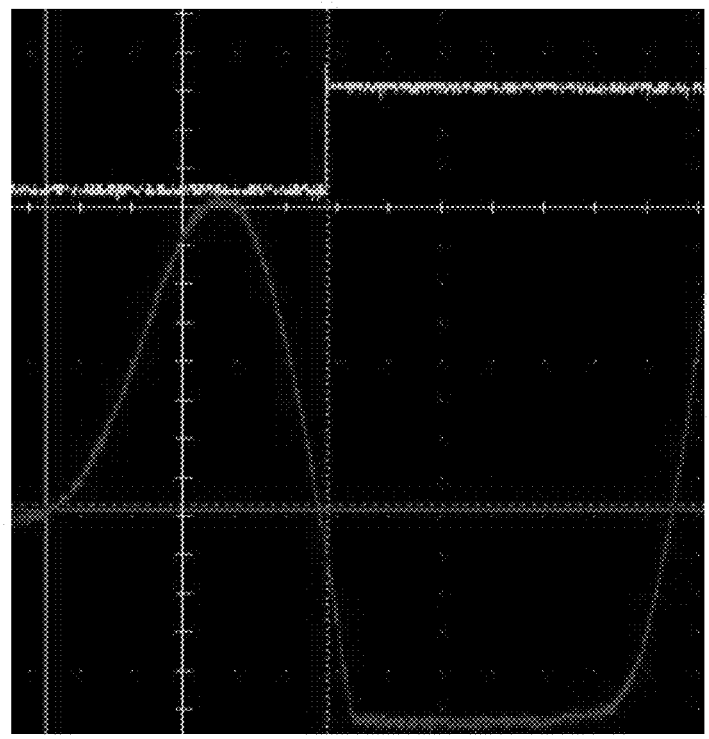
FIG. 5 depicts a graph as showing an example measurement taken using an oscilloscope.

An example measurement as may be taken using an oscilloscope is shown in the example graph 500 of FIG. 5. Since triggering may occur either during first or second phase of the acoustic signal, the signal may be passed through a rectifier to convert the original signal into single polarity to minimize error in latency evaluation. Comparison with the predefined threshold may be made in real time using hardware and/or via software post processing. Electronic comparison with the threshold can be accomplish by using analog comparator or using digital comparator after digitizing the signal and comparing it digitally with the threshold value.

Figure 6:
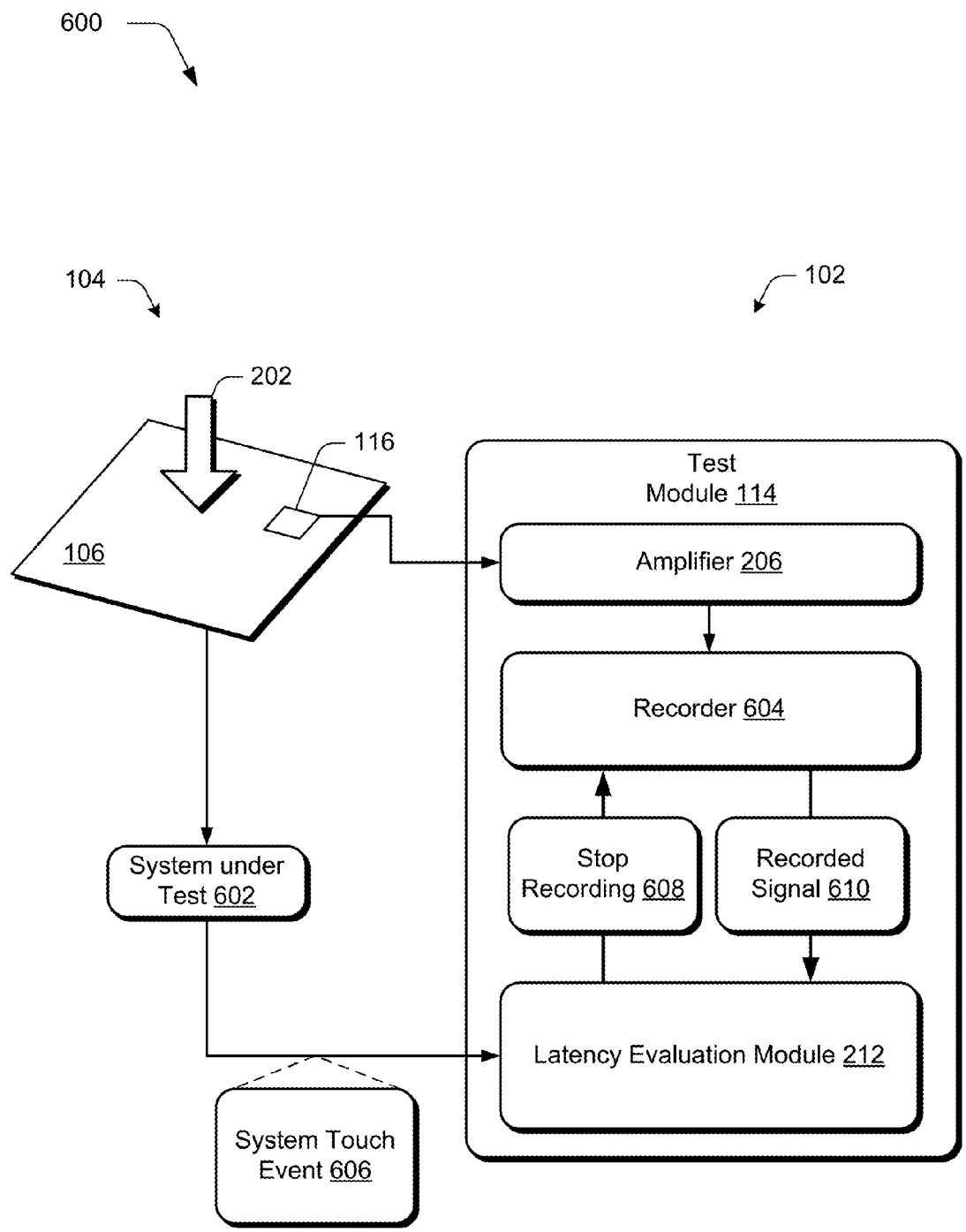
FIG. 6 depicts a system in an example implementation showing a measuring setup for detection of touch event time via software post processing.

FIG. 6 depicts a system 600 in an example implementation showing a measuring setup for detection of touch event time via software post processing. In this example, a system under test 602 (e.g., the touchscreen device 104) is tested by the test apparatus 102 based on a recorded signal.

The test module 114, for instance, may include a recorder 604 to continuously record a signal from the acoustic sensor 116. The recording may be set to last for at least a duration that is greater than expected or known latency of the system under test 602.

Upon receiving a system touch event 606 from the system under test 602, the latency evaluation module 212 may send a stop recording 608 signal to the recorder 604. In response to that signal, the recorder 604 may stop recording and send back the recorded signal 610 to the latency evaluation module 212. The latency evaluation module 212 may then process the data and identify a first moment of time, at which, the recorded acoustic signal has crossed the threshold value as shown in the graphs. Further discussion of acoustic touch sensitive testing may be found in relation to the following procedures.

Although a single acoustic sensor 116 was described above, a plurality of acoustic sensor may be utilized. For example, a plurality of acoustic sensors 116 may be used to perform trilateration to estimate a position of a contact and thus enable an estimation of an amount of time consumed for a wave to reach the acoustic sensors 116. This may be used to provide a better estimate for latency, and hence improve the process. A variety of other examples are also contemplated, such as to employ feedback from both acoustic sensors 116 (e.g., averaging) for processing.

Example Procedures

The following discussion describes touchscreen testing techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1, the systems 200, 600 of FIGS. 2 and 6, and the graphs 300-500 of FIGS. 3-5.

Figure 7:
FIG. 7 is a flow diagram depicting a procedure in an example implementation in which an acoustic testing technique is described.

FIG. 7 is a flow diagram depicting a procedure 900 in an example implementation in which a touch-sensitive surface is tested using acoustic techniques. A touch-sensitive surface of a touch-sensitive device is tested (block 702) by detecting contact made with the touch sensitive surface using an acoustic sensor (block 704). As previously described, the touch-sensitive surface may be configured in a variety of ways, such as a touchscreen device, track pad, and so on. Thus, the touch-sensitive surface may employ a variety of techniques to detect contact, such as capacitive, imaging (e.g., IR, cameras, and so on), and so forth.

Data describing the contact that is received from the acoustic sensor with data describing the contact that is received from the touch-sensitive device (block 706). A test module 114 may employ a variety of different techniques to test a touch-sensitive surface. As shown in FIGS. 2 and 6, for instance, a latency evaluation module 212 may be employed to detect latency in an ability of a touchscreen device 104 to recognize contact. A variety of other examples are also contemplated.

Example Device

Figure 8:
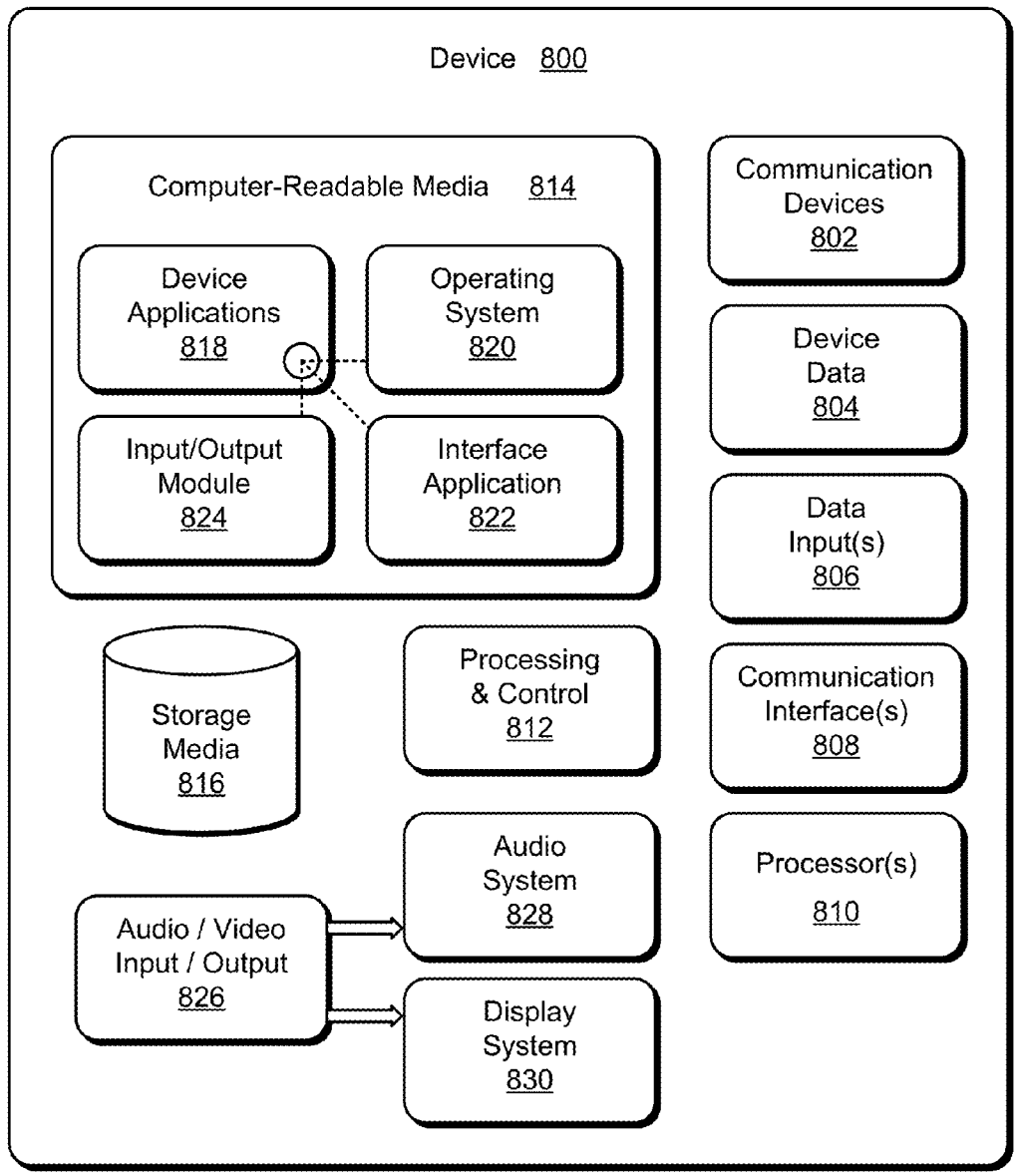
FIG. 8 illustrates various components of an example device that can be implemented as any type of computing device as described with reference to FIGS. 1, 2 and 6 to implement embodiments of the techniques described herein.

FIG. 8 illustrates various components of an example device 800 that can be implemented as any type of computing device as described with reference to FIGS. 1, 2, and 6 to implement embodiments of the techniques described herein. Device 800 includes communication devices 802 that enable wired and/or wireless communication of device data 804 (e.g., received data, data that is being received, data scheduled for broadcast, data packets of the data, etc.). The device data 804 or other device content can include configuration settings of the device, media content stored on the device, and/or information associated with a user of the device. Media content stored on device 800 can include any type of audio, video, and/or image data. Device 800 includes one or more data inputs 806 via which any type of data, media content, and/or inputs can be received, such as user-selectable inputs, messages, music, television media content, recorded video content, and any other type of audio, video, and/or image data received from any content and/or data source.

Device 800 also includes communication interfaces 808 that can be implemented as any one or more of a serial and/or parallel interface, a wireless interface, any type of network interface, a modem, and as any other type of communication interface. The communication interfaces 808 provide a connection and/or communication links between device 800 and a communication network by which other electronic, computing, and communication devices communicate data with device 800.

Device 800 includes one or more processors 810 (e.g., any of microprocessors, controllers, and the like) which process various computer-executable instructions to control the operation of device 800 and to implement embodiments of the techniques described herein. Alternatively or in addition, device 800 can be implemented with any one or combination of hardware, firmware, or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable media 814, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800 can also include a mass storage media device 816.

Computer-readable media 814 provides data storage mechanisms to store the device data 804, as well as various device applications 818 and any other types of information and/or data related to operational aspects of device 800. For example, an operating system 820 can be maintained as a computer application with the computer-readable media 814 and executed on processors 810. The device applications 818 can include a device manager (e.g., a control application, software application, signal processing and control module, code that is native to a particular device, a hardware abstraction layer for a particular device, etc.). The device applications 818 also include any system components or modules to implement embodiments of the techniques described herein. In this example, the device applications 818 include an interface application 822 and an input/output module 824 (which may be the same or different as input/output module 84) that are shown as software modules and/or computer applications. The input/output module 824 is representative of software that is used to provide an interface with a device configured to capture inputs, such as a touchscreen, track pad, camera, microphone, and so on. Alternatively or in addition, the interface application 822 and the input/output module 824 can be implemented as hardware, software, firmware, or any combination thereof.

Additionally, the input/output module 824 may be configured to support multiple input devices, such as separate devices to capture visual and audio inputs, respectively.

Device 800 also includes an audio and/or video input-output system 826 that provides audio data to an audio system 828 and/or provides video data to a display system 830. The audio system 828 and/or the display system 830 can include any devices that process, display, and/or otherwise render audio, video, and image data. Video signals and audio signals can be communicated from device 800 to an audio device and/or to a display device via an RF (radio frequency) link, S-video link, composite video link, component video link, DVI (digital video interface), analog audio connection, or other similar communication link. In an embodiment, the audio system 828 and/or the display system 830 are implemented as external components to device 800. Alternatively, the audio system 828 and/or the display system 830 are implemented as integrated components of example device 800.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method, comprising:
    testing a touch-sensitive surface of a touchscreen device by:
        receiving at the touch-sensitive surface a contact;
        detecting the contact by both a first sensor part of the touch-sensitive surface and a second sensor of a test apparatus, the second sensor being an acoustic sensor, the first sensor being a type other than acoustic, the touch-sensitive surface not containing an acoustic sensor usable to detect the contact, and the second sensor being separate and distinct from the touchscreen device and not used by the touchscreen device to detect the contact;
    sending first data from the touchscreen device to the test apparatus, the first data describing the contact as detected by the first sensor; and
    determining an ability of the touchscreen surface to accurately detect the contact by comparing the first data to second data, the second data describing the contact as detected by the second sensor.

2. The method of claim 1, wherein the testing is configured to determine a latency associated with detection of the contact.

3. The method of claim 1, wherein detecting the contact by both further comprises:
    receiving signals from the second sensor continuously for a prescribed duration;
    analyzing the received signals for a first time point at which at least one signal exceeds a threshold; and
    utilizing the first time point as the first data.

4. The method of claim 3, wherein the threshold is based on a maximum magnitude associated with background noise.

5. The method of claim 1, wherein the touchscreen device is a mobile computing device.

6. The method of claim 1, wherein the touch-sensitive surface is operable as a display for a mobile communications device.

7. The method of claim 1, wherein the first data is based on a time associated with the contact as detected by the first sensor, and wherein the second data is based on a time associated with the contact as detected by the second sensor.

8. The method of claim 1, wherein determining the contact by both further comprises:
receiving signals from a plurality of additional acoustic sensors of the test apparatus;
using the signals from the plurality of additional acoustic sensors to determine a position of the contact; and
determining a latency of the touch-sensitive surface based on the determined position of the contact.

9. A test apparatus comprising:
an acoustic sensor configured for placement proximal to a touch-sensitive surface of a touchscreen device, the acoustic sensor separate and distinct from the touchscreen device and not used by the touchscreen device to detect a contact made to the touch-sensitive surface; and
at least one module that detects the contact by both the acoustic sensor and a first sensor part of the touch-sensitive surface, the at least one module configured to:
receive first data from the touchscreen device describing the contact as detected by the first sensor, the first sensor being a type other than acoustic; and
determine an ability of the touch-sensitive surface to accurately detect the contact by comparing the first data to second data, the second data describing the contact as detected by the acoustic sensor.

10. The test apparatus of claim 9, wherein the comparison of the first data to the second data is used to determine latency associated with detection of the contact.

11. The test apparatus of claim 9, wherein the first data is based on a time associated with the contact as detected by the first sensor, and wherein the second data is based on a time associated with the contact as detected by the second sensor.

12. The test apparatus of claim 9, wherein the touchscreen device is a mobile computing device.

13. The test apparatus of claim 9, wherein the contact is associated with a non-user contact.

14. The test apparatus of claim 9, wherein the first sensor is a capacitive sensor.

15. The test apparatus of claim 9, wherein the at least one module is implemented as one or more of software, firmware, or hardware.

16. A system comprising:
a first sensor part of a touch-sensitive surface of a touchscreen device, the first sensor being other than an acoustic sensor, the touch-sensitive surface not containing an acoustic sensor usable to detect a contact with the touch-sensitive surface;
a second sensor, the second sensor being an acoustic sensor, the second sensor being separate and distinct from the touch-sensitive surface and not used to detect the contact;
at least one processor and a memory;
the memory including at least one module including executable instructions that when executed on the at least one processor is configured to detect the contact by both the first sensor and the second sensor by:
receive first data associated with the touch-sensitive surface describing the contact as detected by the first sensor; and
determine an ability of the touch-sensitive surface to accurately detect the contact by comparing the first data to second data, the second data associated with the second sensor describing the contact detected by the second sensor.

17. The system of claim 16, wherein the comparison determines a latency associated with detection of the contact.

18. The system of claim 16, wherein the touchscreen device is a mobile electronic device.

19. The system of claim 16, wherein the first data is based on a time point associated with the contact as detected by the first sensor, and wherein the second data is based on a time point associated with the contact as detected by the second sensor.

20. The system of claim 16, wherein the second sensor is associated with a test apparatus.

* * * * *